(12) United States Patent
Kundinger et al.

(10) Patent No.: US 8,075,816 B2
(45) Date of Patent: Dec. 13, 2011

(54) FORM STATION PLATEN DRIVE FOR A THERMOFORMING MACHINE AND A METHOD OF LEVELING PLATENS

(76) Inventors: James Kundinger, Auburn, MI (US);
Steve Keeley, Claire, MI (US)

( * ) Notice: Subject to any disclaimer, the term of this patent is extended or adjusted under 35 U.S.C. 154(b) by 92 days.

(21) Appl. No.: 12/799,073

(22) Filed: Apr. 16, 2010

(65) Prior Publication Data
US 2010/0270696 A1 Oct. 28, 2010

Related U.S. Application Data

(60) Provisional application No. 61/212,816, filed on Apr. 16, 2009.

(51) Int. Cl.
*B29C 51/46* (2006.01)
(52) U.S. Cl. ...................... 264/40.1; 425/150
(58) Field of Classification Search .................. 264/39, 264/40.1; 425/150
See application file for complete search history.

(56) References Cited

U.S. PATENT DOCUMENTS

| | | | | |
|---|---|---|---|---|
| 2,309,944 A | * | 2/1943 | Flowers | 425/150 |
| 3,348,406 A | * | 10/1967 | Holberson | 100/257 |
| 3,704,974 A | * | 12/1972 | Kostur | 425/405.1 |
| 4,076,780 A | * | 2/1978 | Ditto | 264/40.5 |
| 5,147,661 A | * | 9/1992 | Kurumaji et al. | 425/150 |
| 5,800,846 A | * | 9/1998 | Hart | 425/504 |
| 5,814,185 A | | 9/1998 | Chun et al. | |
| 6,055,904 A | * | 5/2000 | Chun et al. | 100/257 |
| 6,200,122 B1 | * | 3/2001 | Chun et al. | 425/136 |
| 6,969,246 B1 | | 11/2005 | Kundinger et al. | |

* cited by examiner

*Primary Examiner* — Jill Heitbrink
(74) *Attorney, Agent, or Firm* — John R. Benefiel

(57) ABSTRACT

A platen drive system and method of leveling platens in a forming station of a twin sheet thermoforming machine in which each platen is driven vertically by four independently operated drive units, each having an electric servo motor, the drive units arranged in two sub sets disposed on opposite sides of an associated platen. The platen is leveled during set up by individual operation of the servo motors.

4 Claims, 9 Drawing Sheets

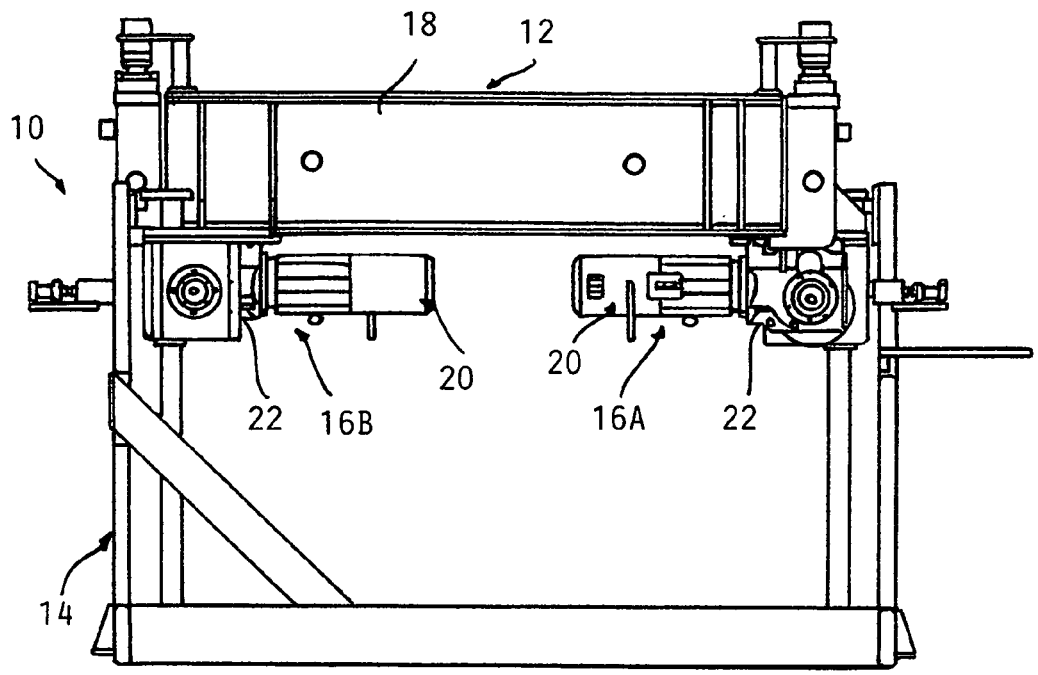
FIG. 3
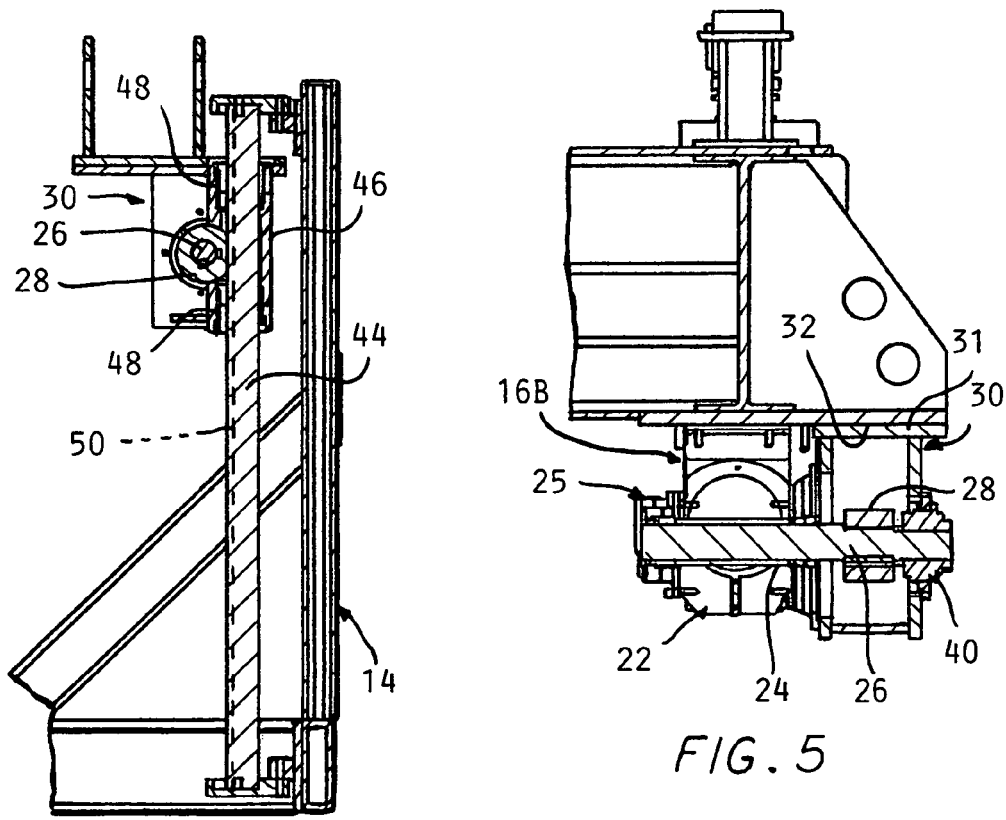
FIG. 4
FIG. 5

FORM STATION PLATEN DRIVE FOR A THERMOFORMING MACHINE AND A METHOD OF LEVELING PLATENS

CROSS REFERENCE TO RELATED APPLICATIONS

This application claims the benefit of U.S. provisional application No. 61/212,816 filed on Apr. 16, 2009.

REFERENCE TO A COMPUTER PROGRAM LISTING APPENDIX

Incorporated by reference are program listings contained on an accompanying CD-ROM (with copy filed herewith), containing two files, LLC-HMI and LLC-PLC created on Mar. 29, 2010.

BACKGROUND OF THE INVENTION

This invention concerns twin sheet thermoforming machines and more particularly platen drives for platens included in a forming station. In the forming station, upper and lower molds are carried by upper and lower platens respectively for forming separate part halves in a well known manner. After the part halves are formed, the upper and lower platens are moved together to fuse the two part halves together. This process and such thermoforming machines are described in U.S. Pat. Nos. 5,814,185 and 6,969,246 assigned to the same assignee as the present application, and are incorporated herein by reference.

It is critical that the molds mate perfectly in order to produce a uniform seam thickness for such a twin sheet molding process when the platens are advanced together, and this requirement in turn requires both platens to be perfectly level to be parallel when fully advanced, particularly with large platens.

However, it is difficult to achieve level platens with large area platens and requires extremely time consuming manual adjustments requiring disassembling of gearing. The meshing of drive gearing with fixed gear rack guide posts typically used to guide the platen motion makes this very slow, difficult and time tedious since variations of the degree of engagement of the drive unit gearing engagement with the four gear racks affects the level condition of such a platen, i.e. a greater degree of engagement slightly elevates the associated platen and a lesser degree of engagement slightly lowers the platen changing the degree of gear engagement with one post may affect another gear-post engagement.

In addition, the perfectly plumbed guide gear rack posts engage guide bushings on the platens during travel of the platens, and even a slight out of level condition would create significant binding in the post/sleeve engagement surfaces, particularly in large area platens and result in rapid wear of the guide bushings to significantly increase maintenance costs.

Conventional platen drives involve one or two motors driving respective sets of gearing which engage associated fixed gear posts to drive the platens.

Machining a large platen is costly as very large machining centers are required to accommodate such platens and align bores at either end of the platen for the respective gearing.

Accordingly, it is an object of the present invention to provide a method for the leveling platens in a thermoforming machine station which reduces the time and difficulty of setting the platens level.

It is a further object to provide a platen drive for thermoforming machine forming station platen which allows simplified leveling of the platens and also lower a cost manufacture of the platens.

SUMMARY OF THE INVENTION

The above recited objects and other objects which will become apparent by those skilled in the art upon a reading of the following specification and claims are achieved by providing thermoformer platen drive comprised of four independently operated platen drive units arranged in two unit sub sets on opposite sides of an associated platen which each drive units include an electric servo motor with encoder and gearing which are normally simultaneously operated to vertically drive each leveled platen up or down. The drive unit controls allow the practice of a method of platen leveling in which each of servo motor may be operated individually in a leveling mode to enable bringing the platen into a level condition quickly and easily by operating each servo motor as needed to level the platen. Differences in the degree of meshing engagement of the various drive pinions with respect to a respective gear rack in this arrangement can be accommodated by the individual servo motor operation and thus does not affect the ability to level the platens.

Thereafter, the individual drive units are operated simultaneously to vertically move each engaged part of the platen precisely equally to maintain a level condition of the platen.

The independent operation of each drive unit allows each gear box/motor drive unit mount to be individually machined and assembled to locating surfaces on the platen machined level in machining centers. Since bore alignment between the mounts are not necessary because of the independently operated drive units, lower cost machining of the platens and drive unit mounts is made possible.

DESCRIPTION OF THE DRAWINGS

FIG. 3 is a side elevational view of the lower platen structure shown in FIGS. 1 and 2.

FIG. 4 is an enlarged view of the section 4-4 taken in FIG. 2.

FIG. 5 is an enlarged view of the section 5-5 in FIG. 2.

DETAILED DESCRIPTION

Figure 1:
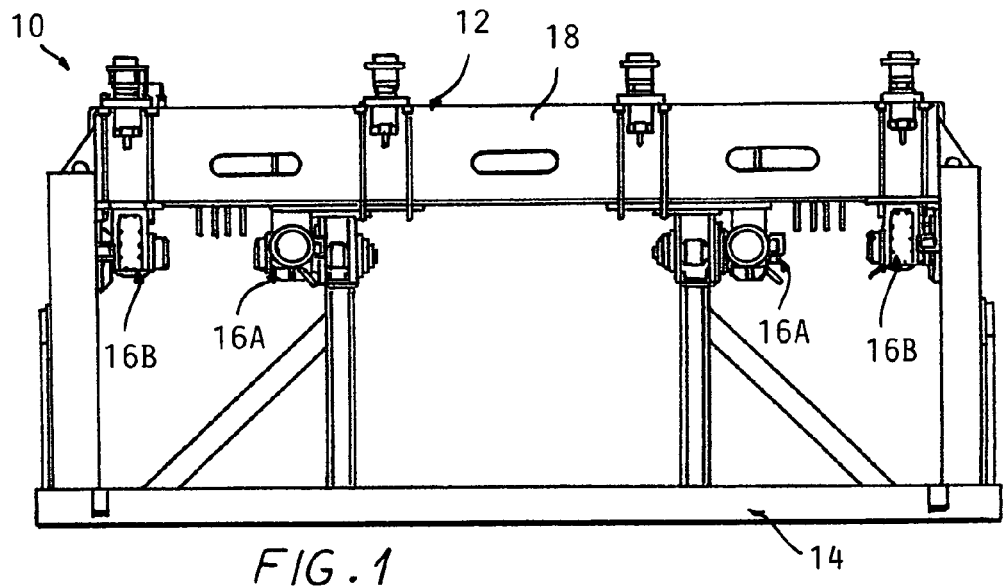
FIG. 1 is a front elevational view of a lower platen and support structure incorporating a platen drive system according to the present invention.
Figure 2:
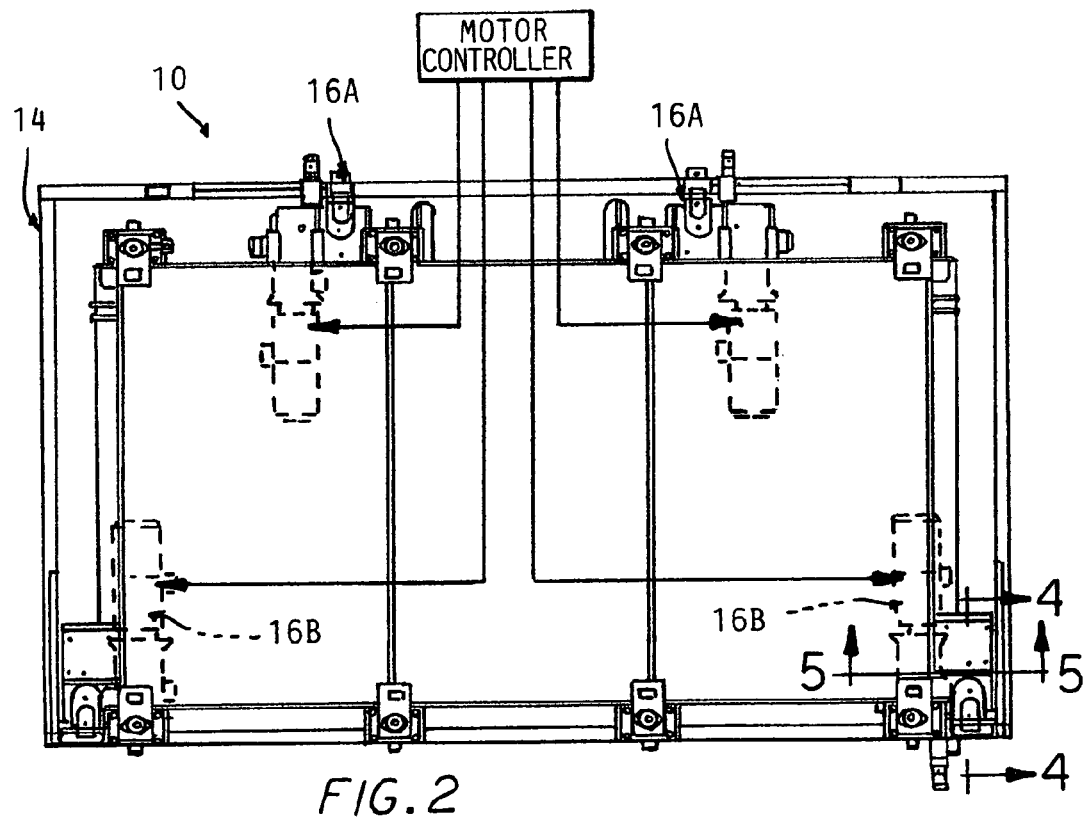
FIG. 2 is a plan view of the lower platen structure shown in FIG. 1 with a diagrammatic depiction of the servo motor control operating the four electric servo motors.
Figure 1A:
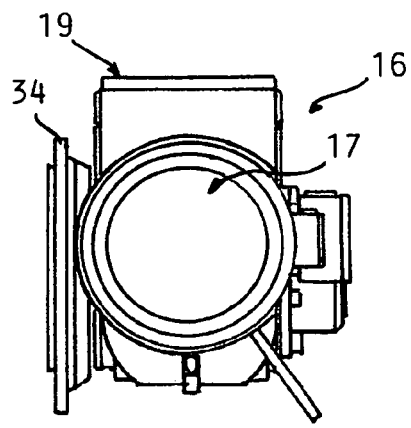
FIG. 1A is an end view of one of the drive units shown in FIG. 1.
Figure 2A:
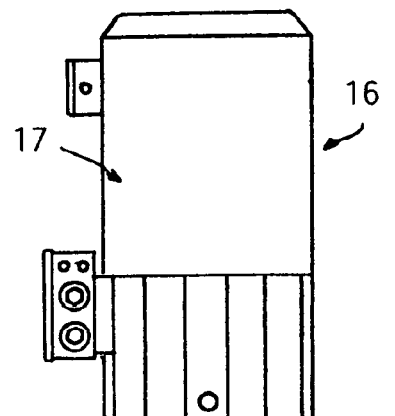
FIG. 2A is a top view of one of the drive units shown in FIG. 2.
Figure 2A:
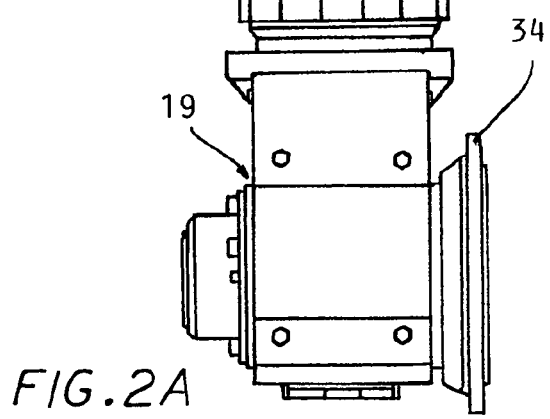

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIGS. 1-9 show a lower platen structure 10 and details thereof, which include a lower platen assembly 12 movably mounted vertically on a support framework 14.

Such platen assemblies are used in the forming station of twin sheet thermoforming machines as mentioned above and described in the molds (not shown) are normally mounted on the platens above referenced patents, incorporated herein by reference.

There are a set of four electric servo motor/gear box drive units provided, in subsets of two drive units 16A, 16B mount on opposite sides of the platen 12, here the front and rear side of the lower platen 12 assembly movable mounted on the lower platen support framework 14.

The drive units 16A are more closely spaced to allow clearance for feeding sheets between the upper and lower platens on a rotary transfer machine in the well known manner. The sides of the platens are normally left clear of support posts in order to allow sheet material to be loaded onto the molds in the well known manner.

The drive units 16A, 16B include an electric servo motor and a right angle gear box 22 having a hollow shaft output 24. Suitable drive units are of a type commercially available under the trade name SEW EURO DRIVE. These motors include a built in encoder which allow precise control over the extent of rotation of the tubular output shaft 24 in the manner well known in the art.

A respective pinion shaft 26 (FIGS. 4,5) is received in each of the hollow gear box output shaft 24 and clamped thereto with a clamping collar 25 to be rotatably connected thereto.

A pinion gear 28 is keyed to the pinion shaft 26, which has its outer end passed through a bore 42 in plate 33 of a drive unit mount 30, and supported in a bearing 40.

Figure 4A:
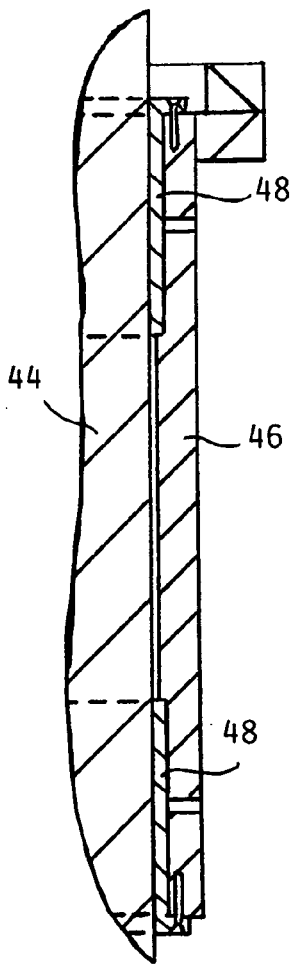
FIG. 4A is an enlarged fragmentary sectional view of a portion of the gear post and guide box shown in FIG. 4.
Figure 4B:
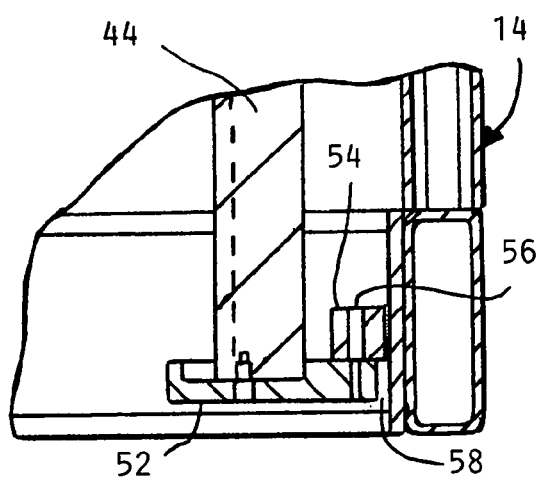
FIG. 4B is an enlarged fragmentary sectional view of a one end of the gear post attachment shown in FIG. 4.
Figure 6:
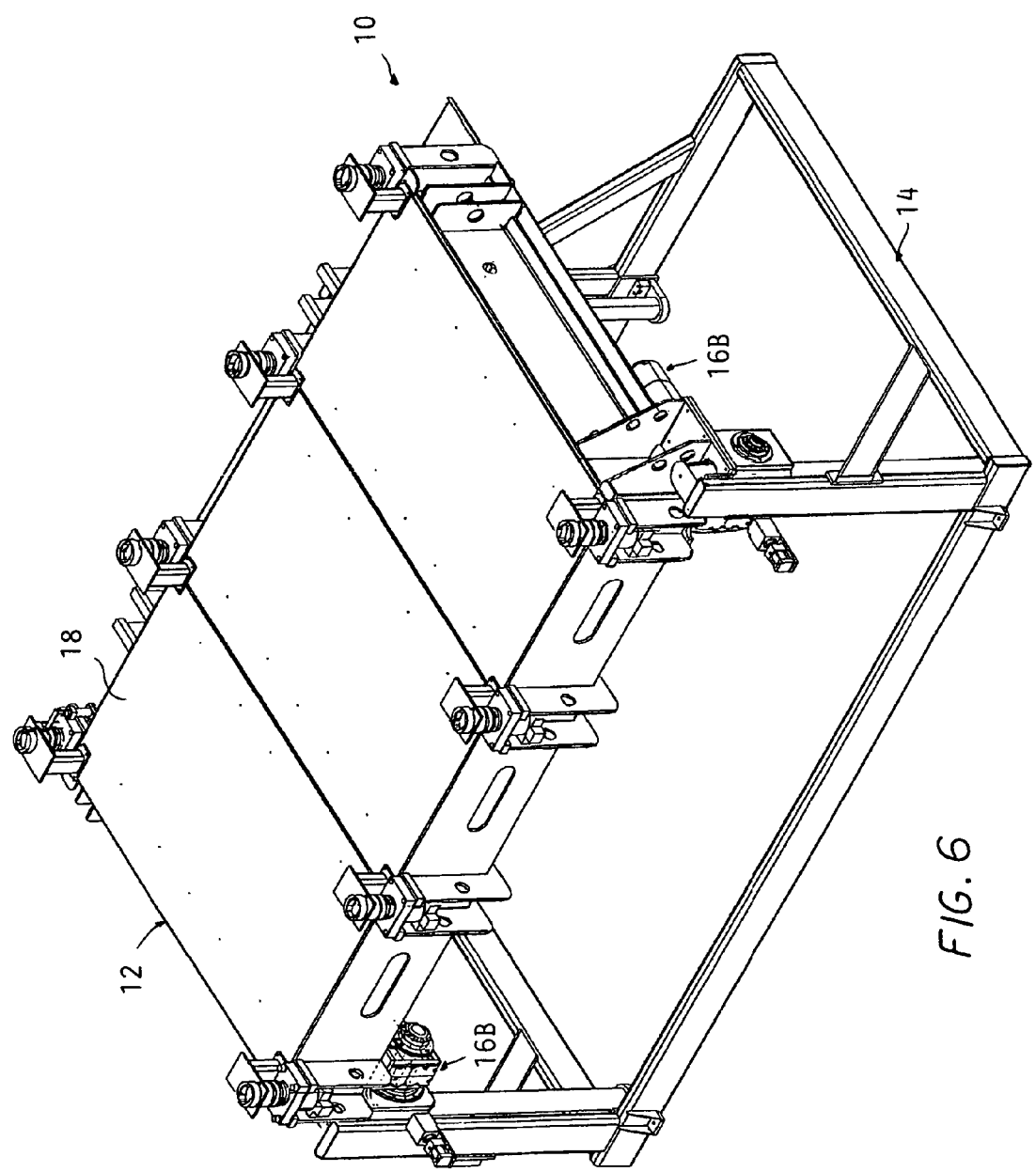
FIG. 6 is a pictorial view of the lower platen structure shown in FIGS. 1-3
Figure 8:
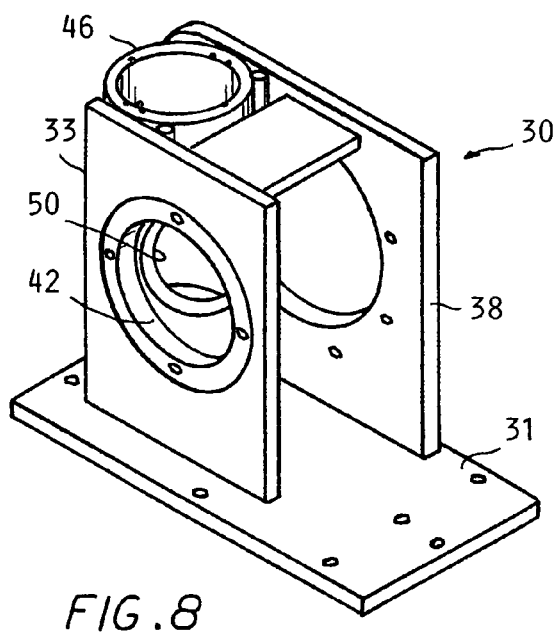
FIG. 8 is a pictorial view from one side of a drive unit mount.
Figure 9:
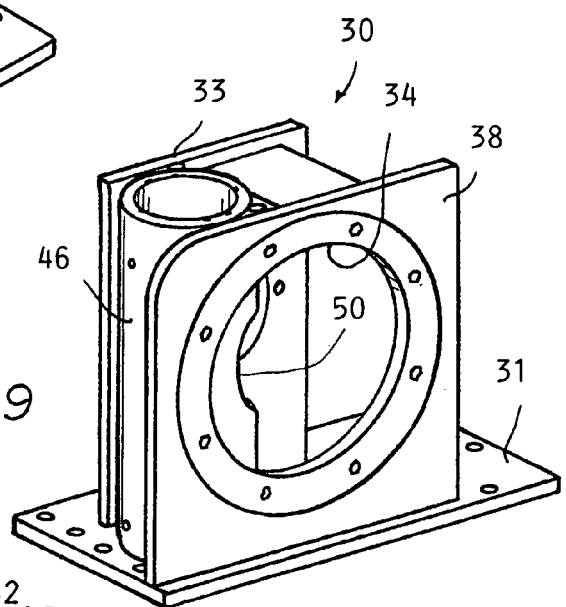
FIG. 9 is a pictorial view of the drive mount shown in FIG. 8 from the reverse side.
Figure 7:
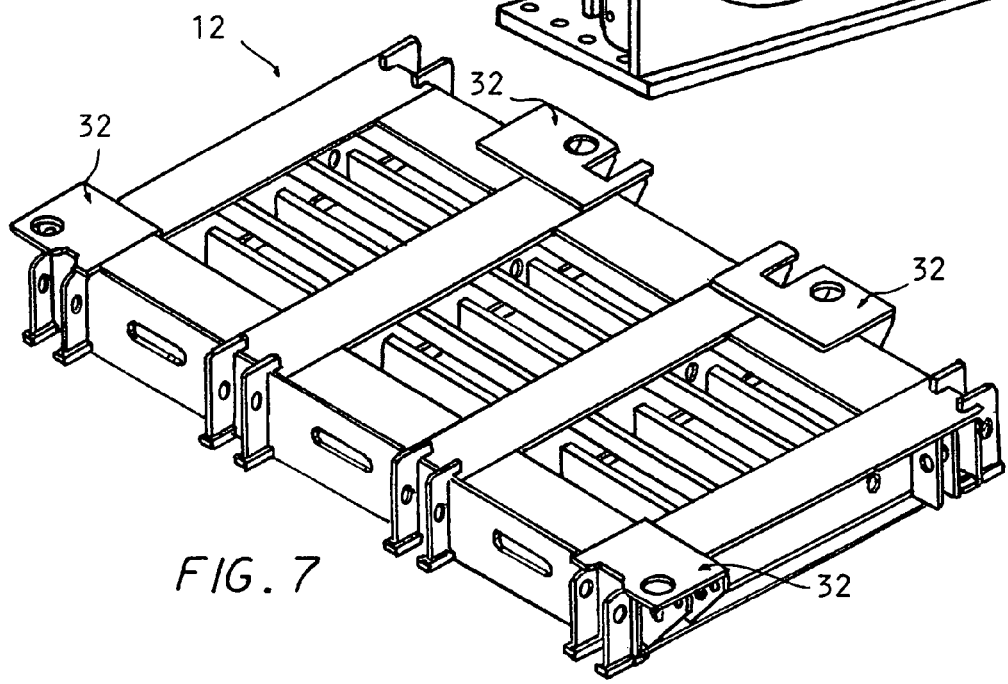
FIG. 7 is an inverted pictorial view of a lower platens shown in FIGS. 1-3.
Figure 10:
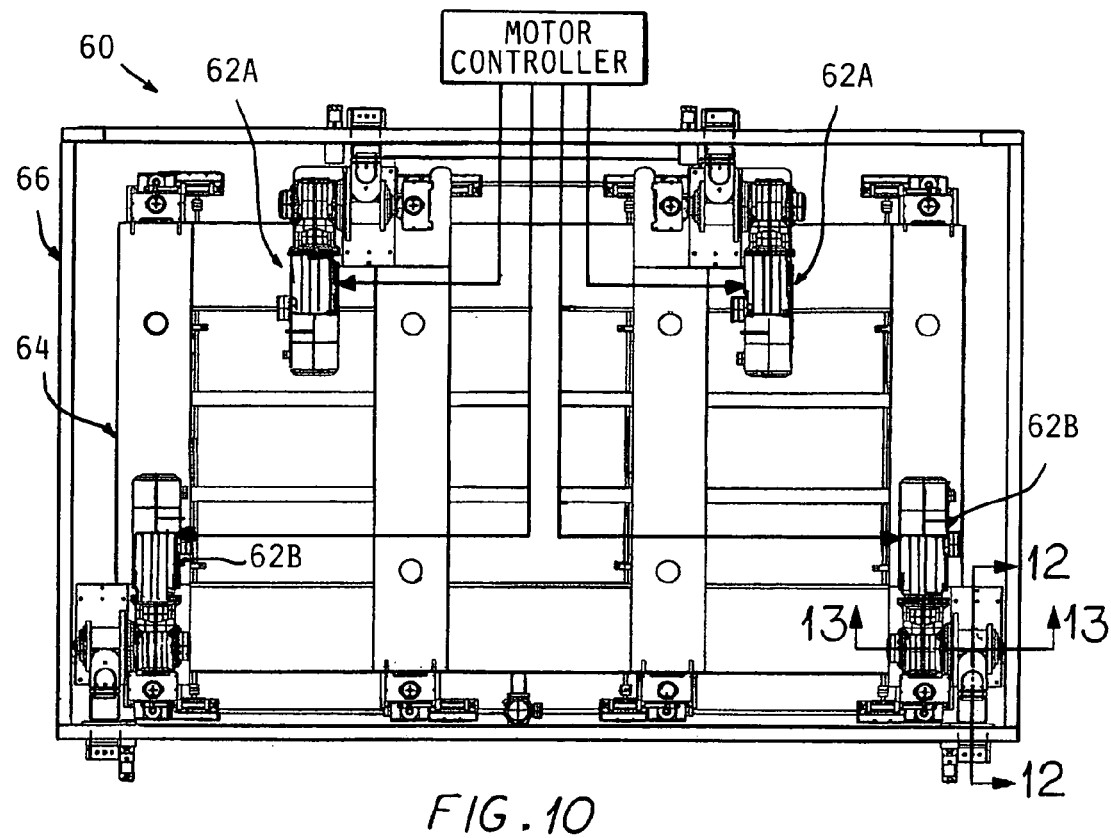
FIG. 10 is a plan view of the upper platen structure with a diagrammatic representation of the servo motor control operating the four electric servo motors.
Figure 11:
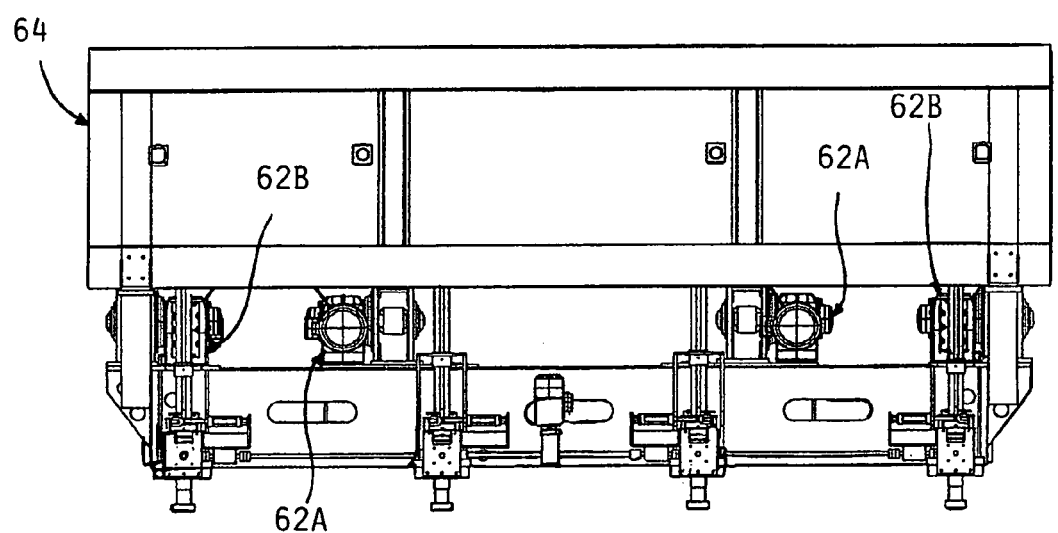
FIG. 11 is a front elevational view of the upper platen structure shown in FIG. 10.
Figure 12:
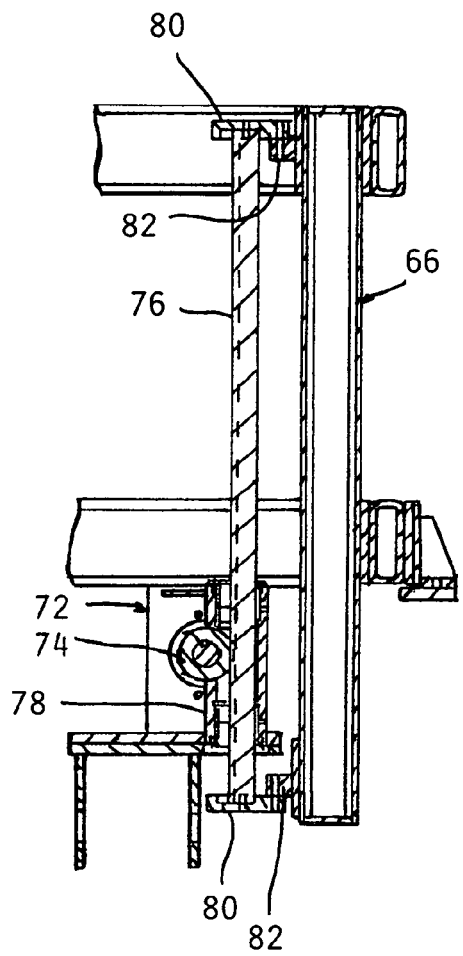
FIG. 12 is an enlarged view of the section 12-12 taken in FIG. 10.

A gear rack 50 machined into a support-guide post 44 adjacent each drive unit 16A, 16B is engaged by the associated pinion gear 28 as seen in FIG. 4. Each guide post 44 is fixedly mounted to the lower platen structure frame 14 at the top and bottom ends, the ends adjusted at assembly to plumb the posts 44. When the drive units 16A, 16B are operated, the lower platen 12 is moved up or down on the lower platen support frame 14.

Each support guide post 44 is received in a guide sleeve 46 and is slidable in guide bushings 48 at the top and bottom of the sleeve 46 (FIG. 4A) included in each of the mounts 30. Each sleeve 46 has a cut out to allow the pinion gear 28 to be positioned to engage a gear rack 50 machined into one side of the guide post 44.

The guide post 44 is slidable within the bushings 48. In practice, one of the posts 44 is initially plumbed with respect to the frame structure 14 by end plates 52 fastened to slotted blocks 54 fixed to frame 14 by screws passing through slots 56 allowing adjustment in one direction. A shimming space 58 allows adjustment in the other direction. Once plumbing of one of the posts 44 is achieved, the plates 54, 52 are welded together.

The other three posts 44 are then plumbed by making any adjustments necessary to release any binding that occurs when the platen 12 is elevated up and down on the posts 44.

The independent operation of the platen drive units 16A, 16B eliminates the need to accurately align bores in the mounts 30 with each other on the platen, greatly easing the difficulty of the machining requirements.

A series of hydraulic bayonet couplings 58 are provided for enabling twin sheet thermoforming operations where two part halves are fused together as described in U.S. Pat. Nos. 5,814,185 and 6,969,246 thermoforming machines assigned to the same assignee as the present application. The other features and details of such twin sheet thermoforming machines are not set forth herein, not forming a part of the present invention.

Initially, the platen 12 is leveled using a machinists' level. In this mode, the drive units 106A, 16B are set for independent operation in a set up mode to carry the platen out leveling process.

Figure 15:
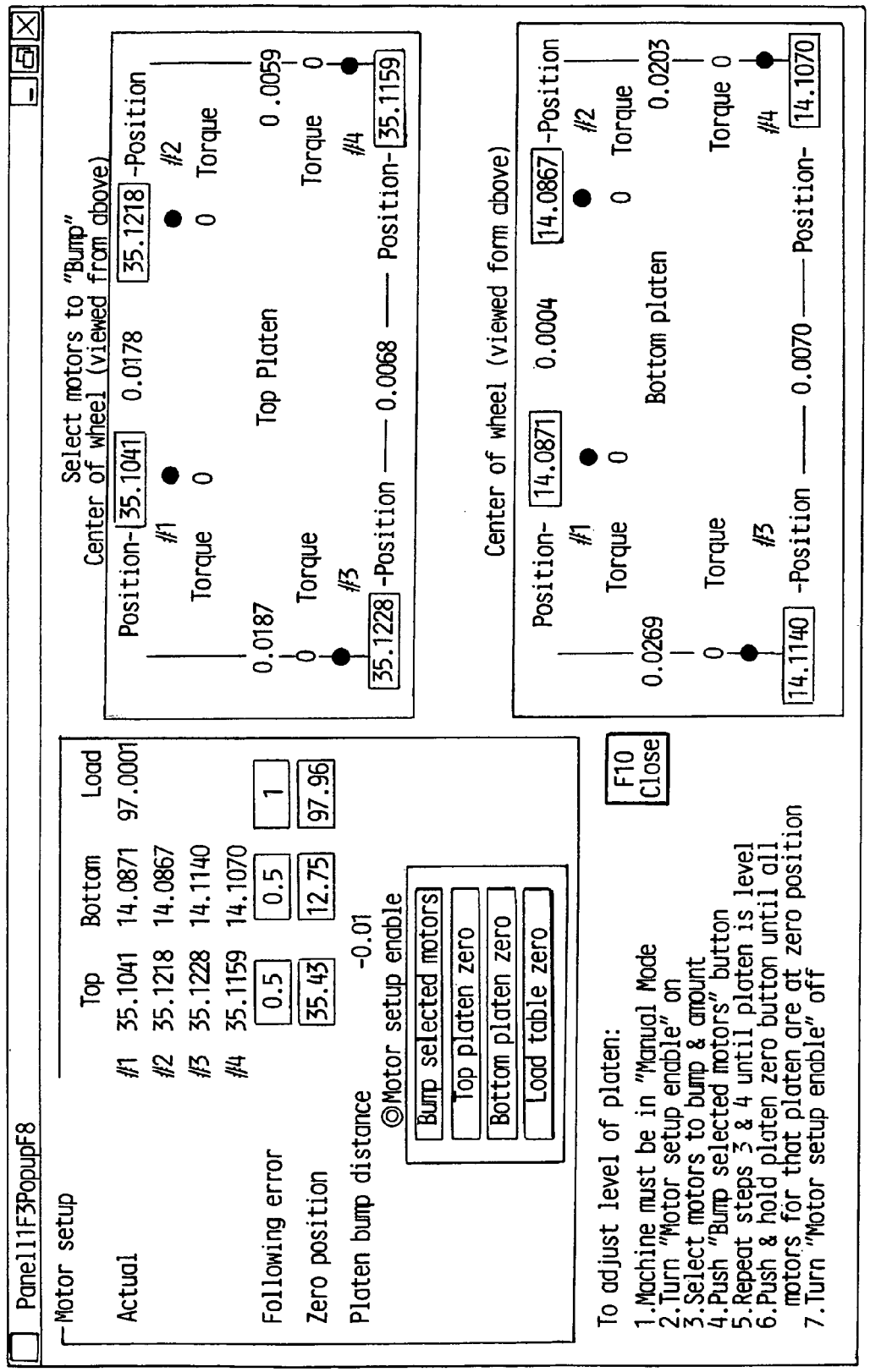
FIG. 15 is a view of a screen shot of one made of the servo motor controller seen in a platen leveling set up mode of the controller.

FIG. 15 shows the operator's control screen in that mode.

In this mode, each servo motor 17 is briefly operated (or "bumped") individually as necessary until the platen 12 is brought to a level. The encoder condition for each motors 17 included in the drive units is then zeroed.

During normal operation, the motors 17 are all operated simultaneously to move exactly the same distance using the encoder outputs to achieve such operation moving the platen 12 vertically while maintaining a level condition, in the well known manner. A suitable software program for carrying out the leveling control is contained in the accompanying Appendix CD's.

FIGS. 10-14 show an upper platen structure 60 also included in a twin sheet thermoformer forming station which is similar to the lower platen structure 10, also including two sets of independent electric servo motors/gear box drive units 62A, 62B mounted to an upper platen 64. These units power vertical movement of the upper platen 64 on an upper platen support frame 66.

Figure 13:
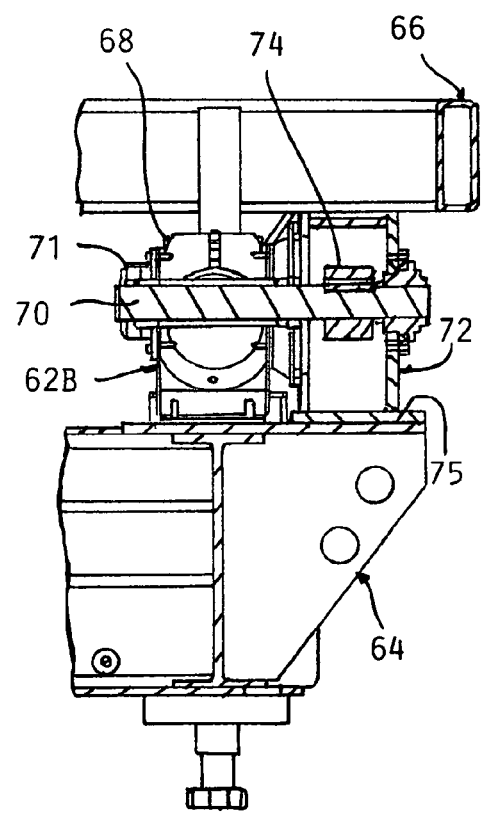
FIG. 13 is an enlarged view of the section 13-13 taken in FIG. 10.
Figure 14:
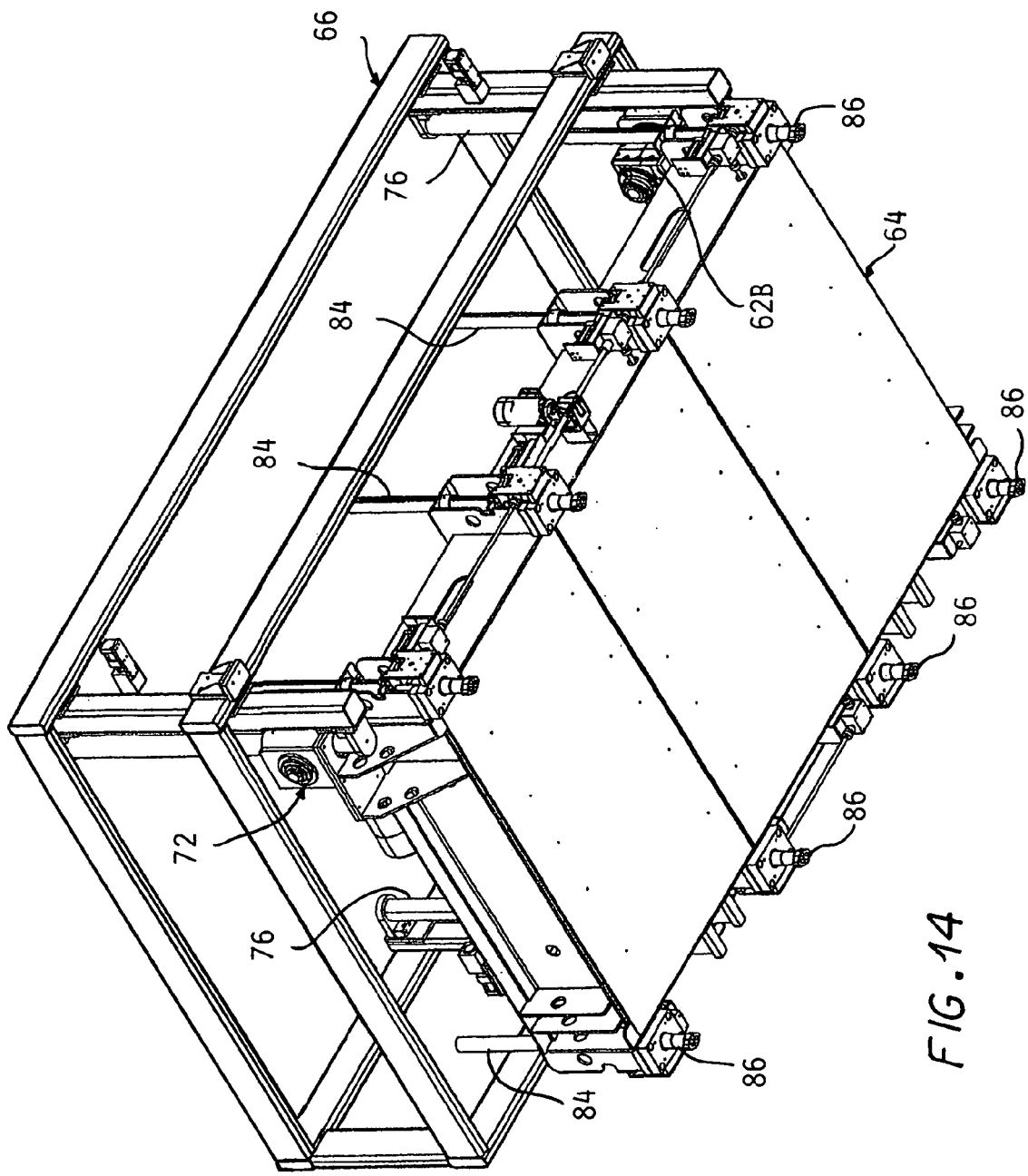
FIG. 14 as a pictorial view from the bottom of the upper platen structure shown in FIGS. 10 and 11.

Each drive unit has an output hollow tube 68 receiving a pinion shaft 70 clamped thereto at one end with a clamp 71 (FIG. 13). A pinion gear 74 is keyed to the shaft 70 which is supported in a mount 72 located on horizontal machined surfaces 75 on the upper platen 64. Each pinion gear 74 engages teeth on a gear rack/support guide post 76 received in a guide sleeve 78 included in the mount 72. The gear rack/support guide post 76 is adjusted to be plumb by caps 80 and slotted blocks 82 so that the upper platen 64 can move freely without binding, as described above in connection with the lower platen 12.

Rods 84 have ends 88 adapted to be locked to the hydraulic bayonet couplings 58 on the lower platen 12 to carry out squeeze fusing of twin parts in the manner described in the U.S. patents referenced above.

Thus, a much simplified platen leveling process is enabled as well as reduced machining costs for large platen forming presses by the independent four motor drive arrangement shown.

The invention claimed is:

1. A method of leveling upper and lower platens of a forming station of a twin sheet thermoforming machine comprising:

installing sets of four individually operable drive units so as to be able to move one point along each said of said platen up and down said drive units each including an electric servo motor with encoder sub sets of two drive units mounted on respective opposite sides of each platen, said servo motors normally simultaneously operated to drive said platen up and down;

measuring the level condition of each platen and front to back direction across said platens;

operating each electric servo motor of each of said drive units individually on each platen as necessary to level each platen in side to side and front to back directions; and thereafter operating said servo motor in each set simultaneously to drive either platen up and down in a level condition.

2. A platen drive system for upper and lower generally rectangular platens adapted to mount a forming die in a forming station of a twin sheet thermoforming machine, said drive systems each comprising:

a set of four drive units, each including an electric servo motor with encoder respectively mounted to each of said upper and lower platens, with each four drive unit sets having two subsets each comprised of two drive units mounted on opposite sides of each platen;

said drive units each drivingly engaged with an associated platen to cause vertical movement of an engagement location on said associated platen, said drive units each independently operable from the other drive units in a set;

said platens each having a series of mounting surfaces machined thereon to be level, each drive unit assembled onto a respective mounting surface; and a set of four vertical guide/gear rack posts mounted to a fixed frame structure for said platens, each post drivingly engaged with a respective drive unit by gearing included in each drive unit to vertically move said location of engagement on an associated platen upon operation of a respective drive unit.

3. The platen drive system according to claim 2 wherein separately machined drive unit mounts are included in each drive unit and are attached to a respective mounting surface on said associated platen.

4. The drive system according to claim 3 wherein each mount includes a guide sleeve slidably receiving a respective guide gear post to guide said mount on said guide sleeve during vertical motion of said platen.

* * * * *